UNITED STATES PATENT OFFICE.

CHARLES H. FRINGS AND BERTHA O. FRINGS, OF NEW YORK, N. Y., ASSIGNORS TO THE BREWING IMPROVEMENT COMPANY, OF MAYWOOD, NEW JERSEY.

PROCESS OF BREWING BEER.

SPECIFICATION forming part of Letters Patent No. 478,188, dated July 5, 1892.

Application filed October 28, 1891. Serial No. 410,112. (No specimens.)

*To all whom it may concern:*

Be it known that we, CHARLES H. FRINGS and BERTHA O. FRINGS, citizens of the United States, and residents of New York, in the county and State of New York, have invented certain new and useful Improvements in Processes of Brewing Beer, of which the following is a specification.

Our invention relates to the process of brewing or manufacturing malt liquors; and its object is to accelerate fermentation and clarification of beers or malt liquors by preventing the admittance to the beer-worts of an indissolvable and disturbing excess of hop-resins, which excess cannot be avoided by the usual method of "hopping" the beer-worts.

The main constituents of hops consist of an astringent and an aromatic-bitter principle intimately associated with different resins. The usual way of extracting hops (strobiles and lupuline) is to boil them in the beer-wort. Besides the astringent principle only a small portion of the water-soluble bitter principle is thereby imparted to the wort, while at the same time nearly all of the volatile odorous principle escapes and a proportionally large amount of the resins enters into the wort, which resins separate when the wort is cooled down for fermentation. A portion of these resins suspended in the wort is gradually dissolved and held in solution by the alcohol formed during fermentation, while a preponderating portion thereof remains undissolved and has to be removed, meanwhile interfering more or less with the progress of fermentation and clarification. The resulting beer, in fact, cannot be considered finished or ripe until the last traces of undissolved resins have been removed or precipitated by long-continued exposure of the fermented beer to a temperature near the freezing-point.

Instead of adding the hops to the wort and boiling them therewith, as usual, we add to the wort an aqueous extract of hops containing the water-soluble constituents, together with only a limited amount of resins.

In preparing this aqueous extract of hops we use what we call "torrefied hops"—that is to say, hops (strobiles and lupuline) which have been gradually subjected to a dry heat of 212° Fahrenheit or more until at least parched. The vapors and gases passing off during torrefaction and containing nearly all of the odorous principle may have been condensed for the purpose of separating an essential oil, of which more or less may be added to the cooled wort before, during, or after fermentation. Hops thus torrefied or heated beyond drying until at least parched have undergone important chemical and physical changes. They have been broken up, the intimate association of the bitter principle with the resins is loosened, and the cells are ruptured to such an extent that they are easily penetrated even by water having a temperature as low as 50° Fahrenheit, yielding thereto a far greater amount of the water-soluble bitter principle than can be imparted to a wort by continued boiling of the hops therein, while with water of the said low temperature the resins are not extracted at all, so that a non-resinous hop extract is obtained, giving the beer a mellowy bitter taste; but for many beers or malt liquors a prominently, or, rather, conspicuously, bitter taste is desired, which, however, can be easily imparted by employing for the extraction of torrefied hops water of a temperature higher than 50° Fahrenheit. The resinous part of torrefied hops being altered, can be fully extracted with hot water without boiling, and by adjusting the temperature of the water accordingly about such portion of the resins is extracted, in addition to the water-soluble bitter and astringent principle, as will be dissolved by the alcohol presumably formed during fermentation, while a small surplus of the resins will not materially interfere with the progress of clarification.

As there is a great difference in the amount of resins contained in hops from different localities, varying from five to twelve per cent., no definite rules can be laid down as to the amount of hops to be used for a barrel of beer of a given percentage of alcohol and as to the degree of temperature of the water to be employed for extraction; but every intelligent brewer will easily find out how to treat a given kind of hops in the production of a beer or malt liquor whose percentage of alcohol he can foresee. We actually use in the production of a barrel of beer or malt liquor showing, when finished, about four and one-half per centum of alcohol one pound of hops containing about ten per centum of resins, the hops (strobiles and lupuline) to be torrefied and then extracted with water of a temperature between 60° and 70° Fahrenheit, thereby imparting to the beer a rich bitter flavor and accelerating fermentation and clarification to such an extent that the beer is finished in about half the time required by any other known method of hopping the wort.

In preparing the aqueous extract we use about four gallons of water to one pound of hops. When more water is used for the purpose of more complete extraction, the extract is by preference concentrated to about two gallons.

For preparing our extract in large breweries we prefer the use of a diffusion-battery, while for small breweries maceration followed by expression will be preferable; but any other suitable means for extracting the torrefied hops with water may be employed. The extract thus obtained may be added to the beer-wort at any stage of preparing the wort, and coagulation (curdling) will follow immediately.

We do not claim in this specification the method of torrefying hops by itself; but

What we claim as new, and desire to secure by Letters Patent, is—

The method of hopping wort, which consists in subjecting the hops to a dry heat beyond drying until at least parched, extracting the hops thus treated with water at a temperature above 50° Fahrenheit, and adding the extract to the wort, substantially as and for the purpose specified.

In testimony that we claim the foregoing as our invention we have signed our names, in presence of two witnesses, this 27th day of October, 1891.

CHARLES H. FRINGS.
BERTHA O. FRINGS.

Witnesses:
A. FABER DU FAUR,
F. FOHR.